Feb. 18, 1941.  A. SKOK  2,232,015
VARIABLE STEERING CONTROL AND FLOATING AXLE
Filed Nov. 24, 1937  3 Sheets-Sheet 1
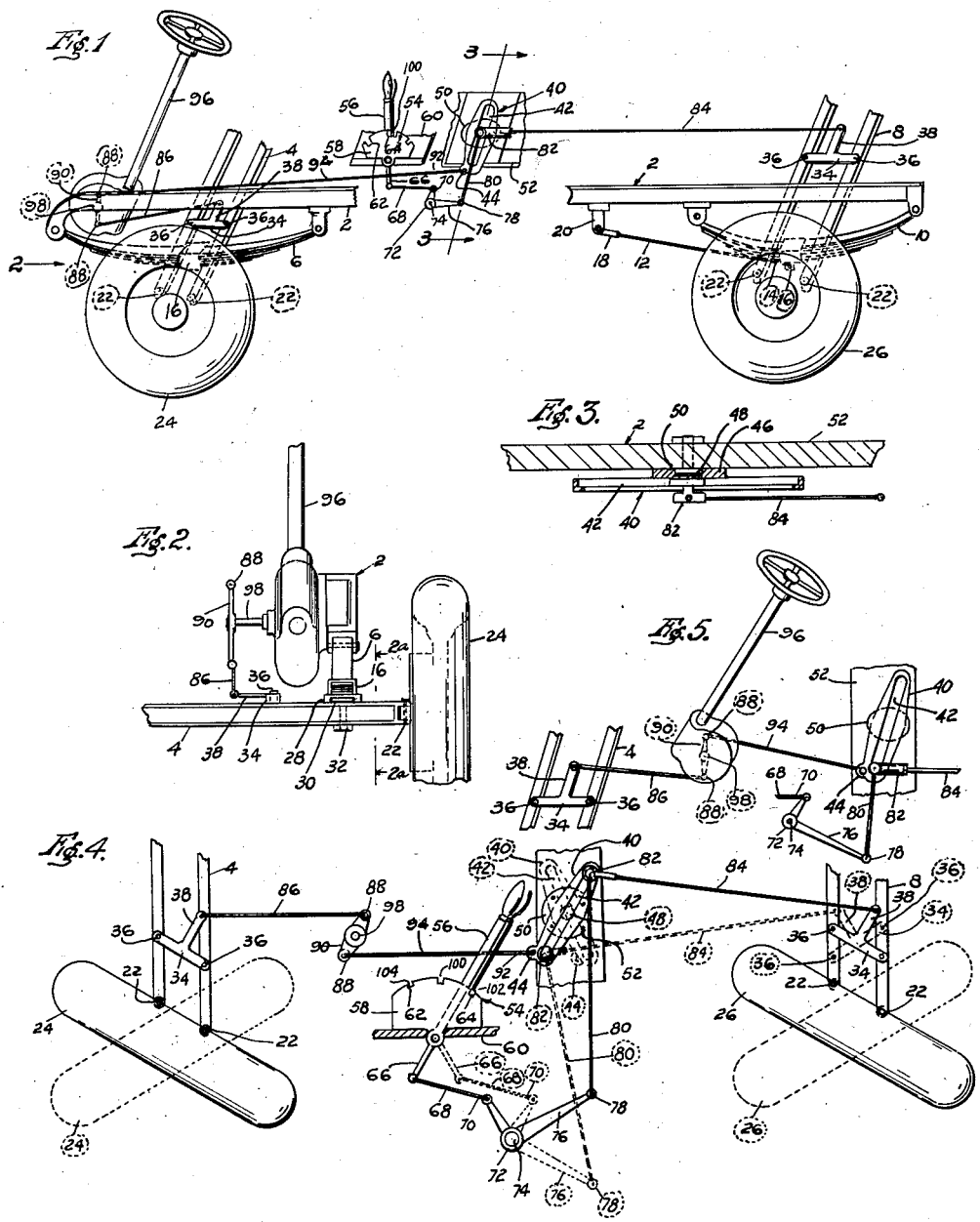
INVENTOR
Alois Skok

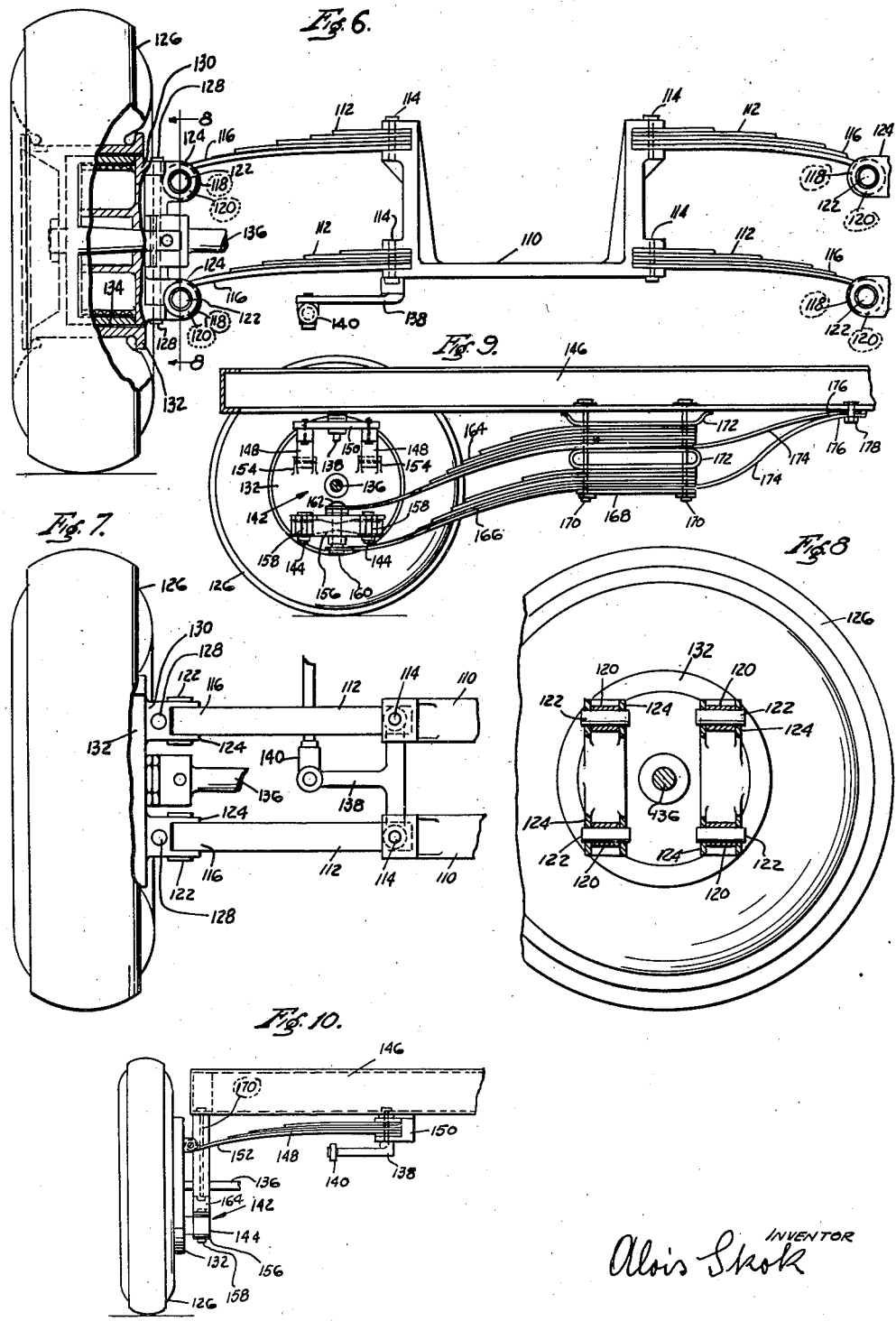

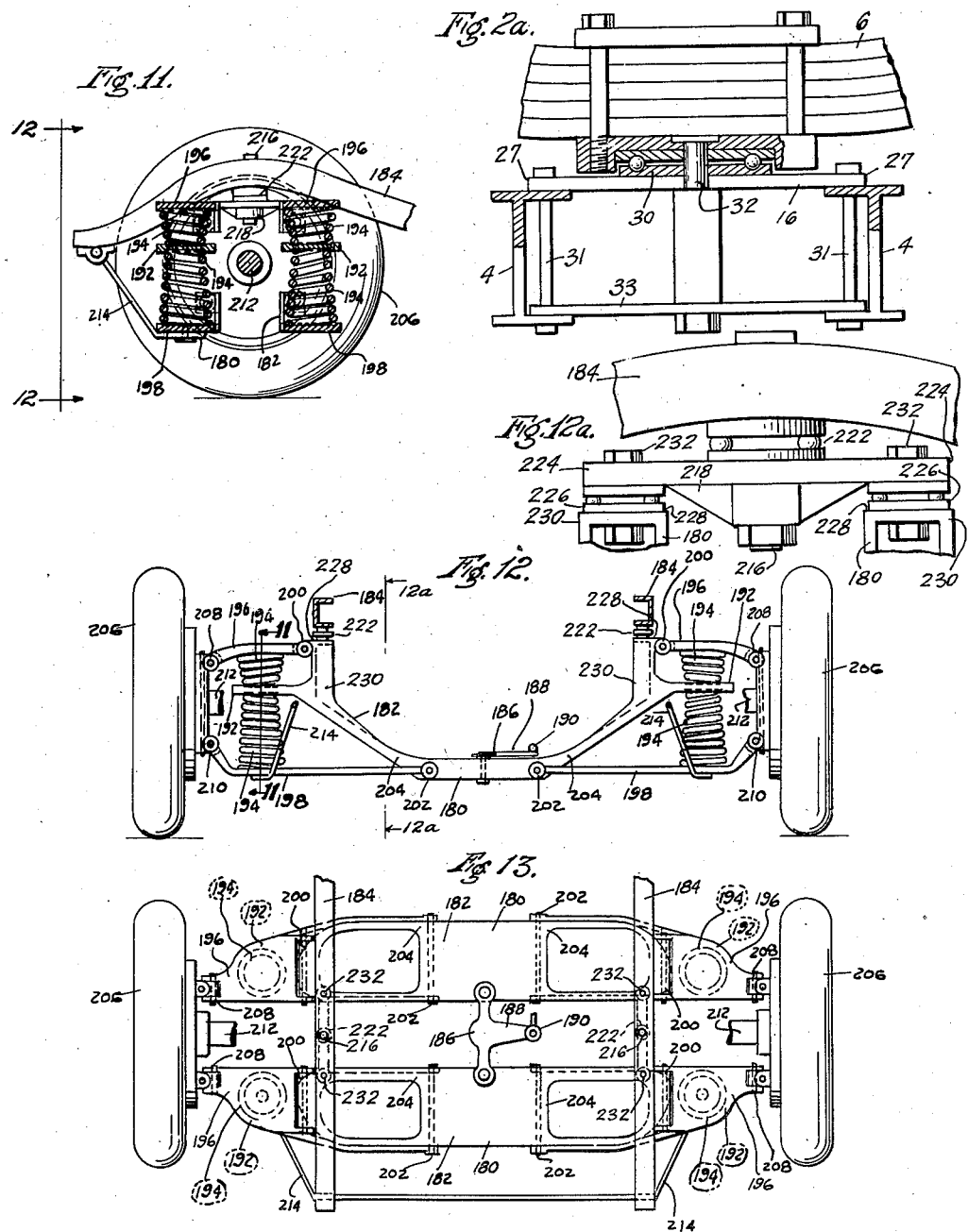

Patented Feb. 18, 1941

2,232,015

UNITED STATES PATENT OFFICE 2,232,015

VARIABLE STEERING CONTROL AND FLOATING AXLE

Alois Skok, Pasadena, Calif.

Application November 24, 1937, Serial No. 176,214

3 Claims. (Cl. 280—96.2)

My invention relates to variable steering and floating axle mechanism and more particularly to devices which are especially adaptable for controlling the position and supporting the wheels of the vehicle and thereby providing easiness of controlling the movement of said vehicle, either while in motion or at rest.

Accordingly, an object of my invention is to provide a simple and inexpensive controlling device, which may be substantially associated with the vehicle frame or chassis, having the controlling lever placed in such a position whereby it may be easily and freely handled, in order to facilitate its operation.

Further object of my invention is to provide said chassis with a plurality of floating axle members, constituting the front and the rear axles of the vehicle, said axle members comprising transverse beams having each end provided with means to carry the vehicle wheels at either end, said wheels being mounted and attached thereto by means of suitable pins, also, having the axle spring members mounted upon a common pivot pin, which may, if so desired be provided with a suitable frictionless thrust bearings, said mechanism including a simple control member which is provided with a control extension, so that the angular position of the said wheels may be easily controlled.

Another object of my invention is to provide said apparatus with a central controlling means, which is attached to the axle wheel control extension by means of suitable control rods, which are also connected to the steering wheel control lever, so that during the operation of the apparatus, any desirable angular position of the wheels may be had.

Further object of my invention is to provide said apparatus with a selective control means, which is operated independently by means of suitable lever means and separately from the axle wheel control, adapted to work and operate in conjunction therewith, so that distinctly and separately arranged selective positions of the wheels may be had and maintained.

Further object of my invention is to provide a central axle frame member to which the chassis of the vehicle may be attached, said central frame member having a pair of cantilever springs attached thereto, the ends of which are provided with suitable spring bearings and which are connecting the corresponding wheel bearings positioned at the end plate of the wheel brake drums, thus allowing a uniform movement of either of the wheels in respect to said chassis of the vehicle and also allowing more flexibility and resiliency to the vehicle while said wheels are rolling over uneven surfaces.

Another object of my invention is to provide said front and rear axle frames with a pair of axle members which are hingedly attached to the vehicle wheels, having suitable shock absorbing members associated therewith for preventing the re-bound in case said wheels are obliged to roll over the uneven surfaces of the road and also providing suitable means for controlling the parallel position of said axle members in order to control said wheels in the desired direction.

Other and further objects and advantages of my invention as will hereinafter more fully appear, I attain by the construction herein illustrated on the drawings and described in the specification forming a part of my application.

Reference is had to the accompanying drawings, in which the similar characters denote the similar parts.

In the drawings:

Fig. 1 is the fragmentary perspective view of the controlling device, shown in neutral position.

Fig. 2 shows the front end elevational view of the steering mechanism, which is attached to the vehicle frame, having the axle wheel control associated therewith, and taken in the direction of the arrow 2.

Fig. 2ª shows a fragmentary cross-sectional and a side elevational view of the pair of axle members connection, showing the position of vehicle springs in relation to said axle members, taken in the direction of the arrow 2ª of the Fig. 2.

Fig. 3 shows a fragmentary and slightly enlarged cross-sectional view of the control members, taken on the line 3—3 of the Fig. 1.

Fig. 4 shows a plan diagrammatical view of the control apparatus, showing various positions of the vehicle wheels and their respective positions in reference to the selective control and the central control mechanisms.

Fig. 5 shows the position of the steering member of the vehicle in modified form, and in respect to the front axle and the central controlling mechanism.

Fig. 6 is the fragmentary front elevational and partly cross-sectional view of the axle member, having the springs of the axle connected to the wheels which are provided with a center drive shaft, showing same in modified form.

Fig. 7 is the fragmentary top view of the axle member, taken from the top of the Fig. 6.

Fig. 8 is the side elevational and cross-sectional view of the wheel hinge member, taken on the line 8—8, of the Fig. 6.

Fig. 9 is the fragmentary side elevational view of the axle and spring members, which is shown in modified form.

Fig. 10 shows the fragmentary rear elevational view of the axle and spring members, taken from Fig. 9.

Fig. 11 shows the fragmentary side and partly cross-sectional view of the floating axle, showing the supporting springs in proper relation to the wheel and the wheel frame, shown in modified form.

Fig. 12 is the front elevational view of the floating axle, shown attached to the wheels of the vehicle, taken in the direction of the arrows 12—12, directed to the front of the vehicle, shown in Fig. 11.

Fig. 12ª is the fragmentary and elevational view of the axle members shown connected to the vehicle frame, taken in the direction of the arrow 12ª of the Fig. 12.

Fig. 13 is the top view of the floating axle, shown attached to the chassis of the vehicle, taken from the top of the Fig. 12.

Describing my invention more in detail, in its broader aspect, said invention comprises a chassis frame, generally designated by numeral 2 which is provided with a pair of front axle members 4 having a front spring member 6 associated therewith, while at its rear, said frame 2 is provided with a pair or rear axle members 8 having a suitable rear spring member 10 connected thereto and supported in place by means of a rod member 12, of which, the rear end 14 is connected to the axle mounting plate 16, while the frame end 18 connects by means of a suitable bracket member 20 with said frame 2, as shown.

Said front and rear pair of axles 4 and 8 respectively, each forming an independent unit, are provided with suitable end knuckle bearings 22, so that each axle end will constitute a pair or a unit of bearings, to which the vehicle wheels 24 and 26 respectively, are attached supporting the entire combine and upon which said wheels swivel sidewardly, as shown in Fig. 4.

In close proximity to said knuckle bearings 22 a suitable pivot plate 28 is positioned, see Fig. 2, which is provided with a frictionless thrust bearing 30 and which is also equipped with a king pin member 32 to which the axle mounting plate 16 is attached and which is for the purpose to hold the center section of said spring members 6 and 10 thereon and in place.

In order to hold each pair of said axle members 4 and 8 in a proper and parallel relation to each other and in a proper relation to said chassis frame 2, the plate ends 27 of said axle mounting plate 16 are provided with suitable pivot bolts 31, which engage said axle members, as shown in Fig. 2ª, each bolt 31 extends downwardly for engaging the ends of a suitable supporting plate 33, while the king pin member 32 extends through the center of said mounting plate 16 including said supporting plate 33 as shown, thus allowing said pair of axle members 4 and 8 to actuate parallelly, as shown in Fig. 4.

To control the position of the wheels 24 and 26 respectively, while the axle units 4 and 8 are pivotally engaged by means of the king pin members 30, said pair of axle members are provided with a control bar 34 which is pivotally engaged with each of said axle members by means of a pivot pin 36, having a suitable extension member 38 associated therewith, as shown, the purpose of which will be presently described.

Centrally, between the front and the rear spring members 6 and 10 respectively, is positioned a central control bar 40 which comprises a central T-slot 42 having one side thereof provided with an eyelet 44, also, having a pivot plate 46 pivotally attached thereto by means of suitable swivel pin 48, to which a control bar mounting plate 50 is attached and which is provided with suitable holes adapted to be used for fastening it in place to the frame cross piece 52, or if so desired, it may be attached and held in place in any manner in practice most desirable.

In order to provide a variable movement for the mechanism, a suitable selective control 54 is provided therein, which comprises a lever member 56 pivotally mounted within a housing 58, which is mounted upon the frame cross member 60, said housing 58 having a plurality of notches 62 adapted to receive therein a suitable lever latch member 64, as shown.

Said lever 56 is also provided with an extension 66 to which a lever tie rod 68 is attached, having its end 70 connecting the crank member 72 which is pivoted to the frame as at 74 having its arm 76 extended outwardly and terminating with an eyelet 78 to which a suitable link rod 80 is attached and which controls the position of the selector member 82, as shown, the operation of which will be presently described.

In order to synchronize the movements of said wheels 24 and 26 respectively, said rear axle bar extension 38 is connected by means of suitable connecting rod 84 to the selector member 82 and said front axle bar extension 38 is provided with a suitable front link member 86 which also connects one end 88 of the steering gear lever 90, while its other end is provided with a suitable mid-rod 94 of which its end 92 connects the said eyelet 44 of the control bar 40.

It may be noted, that when operating the steering wheel 96, said gear lever 90 will oscillate about its pivot point 98 causing the front link member 86 and the mid-rod member 94 to move in opposite directions and that at the same time, said control bar 40 will turn about its swivel pin 48, so that, when said selector member 82 is held in the center, as at 100, see Fig. 1 and held in place by means of the lever 56, which is locked in position by means of the latch member 64 within the center notch 62, only the front axle control bar member 34, operable by means of the said extension 38, will cause said axle bars 4 to change their lateral positions thus causing said wheel 24 to swivel sidewardly, because it is controllable only by the steering wheel 96.

However, should it become necessary to swivel the rear wheels 26 in the same direction and in parallel to the front wheels 24, as shown in Fig. 4 then the said control lever 56 is moved accordingly into the notch 102, which will cause the selector member 82 to be held in its extreme position, causing the connecting rod 84 to operate said rear axle bar extension 38 in accordance and in synchronism with the front mechanism of the device, as previously described.

Further, should it become necessary to reverse the action of the rear wheels 26, the control lever 56 is then placed in the front notch 104, which will cause said selector member 82 to move into opposite and the extreme position, see Fig. 4 (shown in dotted lines) thus causing the connecting rod 84 to operate said rear axle bar extension 38 in the opposition to the front bar extension and therefore allowing the wheels 26 to swivel contrary to the movement of said front wheels 24, as shown.

In view of the above, it may be noted that the vehicle may be operated at an angle and parallel to the side of the vehicle, which at times is necessary, particularly when moving the vehicle out of close quarters, too near to the wall or the street curbing, also that the mechanism, when properly managed and controlled, may be used for eliminating a wide circular movement of the vehicle, or its trailer and therefore eliminating the driving hazards, especially when making sharp turns.

In the Fig. 6, I have shown an axle frame 110 having a pair of cantilever springs 112 which may be attached thereto by means of bolts 114 or, in any other manner most adaptable in practice, of which, the spring ends 116 are provided with suitable spring end bearings 118 having suitable bushing 120 adapted to receive therein a suitable pin 122.

Said spring ends 116 are fitted within suitable shackle members 124 wherein they are held by means of the pins 122 in horizontal position, thus allowing an upward and downward movement and in order to allow said axle frame 110 a horizontal movement in respect to the position of the wheels 126, said shackle members 124 are hingedly connected therein and held in place by means of bolts 128 for connecting the corresponding shackle members 130 forming an integral part of the plate 132 and constituting the brake drum member 134 of said wheels 126.

By reason of the aforementioned construction, the wheel center sections are free to be provided with a driving axle member 136 and also allowing a free and parallel movement of the said axle frames 110 which are actuated by means of the controlling link member 138 and operated by the control rod member 140.

In the Fig. 9, I have shown the axle member 142 connected to the wheel drum plate 132 of the wheels 126 by means of a pair of swivel bosses 144 which in operation will permit a horizontal movement of the frame 146, while the cantilever spring members 148 are attached to said frame by means of suitable brackets 150, having the spring ends 152 engaging said wheel drum plates 132 by means of a pair of shackle members 154.

The sideward movement of the wheels 126 is controlled by means of the link member 138 as previously mentioned, which allows free movement and sufficient space for the driving axle member 136.

Said swivel boss 144 is provided with a cross link 156 which is hingedly attached thereto by means of pins 158 while the center boss 160 is provided with suitable king pin 162, to which, at the top section, the upper spring member 164 is attached thereto and at the bottom, a bottom spring member 166 is connected, having the spring saddle 168 connected to the said frame 146 by means of bolts 170 and supported in place by means of suitable spring cushions 172 including the spring extensions 174 of which, the ends 176 are secured to said frame 146 by means of suitable bolts 178, as shown.

It may be noted, that in operation, the combined spring elements will support the frame 146 and hold the wheels 126 in place, allowing also the sideward movement of the wheels, which will not interfere with the driving element of the vehicle.

In Fig. 11 I have shown the floating axle member 180, comprising a central frame section 182 to which the vehicle chassis 184 is attached, said frame 182 being operable by means of the control link member 186 and actuated by the link extension 188 engaging the control rod 190.

The central frame 182 comprises a pair of spring saddles 192 upon which a pair of suitable springs 194 rests, one at each side, which are held in place by means of a pair of spring supporting plates 196 and 198 respectively.

The upper plates 196 are hingedly connected as at 200 to each end of the said central frame 182, while the said bottom plates 198 are connected as at 202, to the lower section 204 of the frame 182, thus allowing said springs 194 to be held at diversified tension and therefore concentrating the spring forces at the saddle plates 192 during the variable movement of the wheels 206, which are hingedly connected to the upper plate 196 by means of suitable shackles 208 and to the bottom plate 198 by means of the shackle members 210, their construction and connection to the wheels 206 being identical to one shown in Figs. 6 and 7, therefore further explanation is not deemed necessary.

It may be noted however, that the said axle members 180 are mounted in pairs, see Fig. 13 and that sufficient clearance is provided therein for the parallel movement thereof and for the driving axle member 212, or any other driving element which may be used for propelling the vehicle, further, in order to provide sufficient stability of the axle 180 with the frame 184, therefore suitable rod member 214 is provided therein, as shown.

For holding said vehicle frame 184 in a proper relation to said axle members 180, a suitable king pin 216 is provided therein, see Fig. 12ª which is mounted within said frame 184 and extends downwardly for engaging a suitable cross plate member 218, having a suitable frictionless thrust bearing 222 disposed in-between the upper surface of the cross plate member 218 and the underside surface of said vehicle frame 184, also, said plate member 218 having each of its ends 224 provided with a suitable frictionless thrust bearing 226 each of which is disposed in-between the underside surface of said plate ends 224 and upon the surface 228 of the upwardly extending frame extension 230 of said frame section 182, said ends 224 including said bearing 226 at the surface 228 of said frame extension 230 are held in place by means of a suitable pivot bolts 232, thereby supporting the load imposed upon said vehicle frame 184 and also allowing said axle members 180 to actuate and operate parallelly to each other by means of said control link member 186, hereinbefore mentioned.

While I have thus described my invention with great particularity it will be clear that the same may be modified throughout a wide range. I accordingly do not propose to be limited to the exact details of construction herein shown and described, but reserve the rights in practice to make the necessary changes and modifications therein which may come within the scope of the appended claims.

I claim as my invention:

1. In the apparatus of the class described adapted for supporting and for controlling the movement of the vehicle wheels comprising a frame, a pair of parallelly disposed front axle unit means connected to the front section of said frame, and a pair of parallelly disposed rear axle unit means connected to the rear section of said frame, a centrally positioned controller means connected to said frame and associated with said rear pair of parallelly disposed axle unit means for controlling the position of said axle unit means, a selector means associated with the last mentioned means for selectively holding and for maintaining the selective position of said controller means, a pair of supporting means positioned at each end of said pair of axle unit means for holding them supported upon and connected to the vehicle wheels, axle control bar means connected to said front and rear axle unit means for swivelling said axle unit means in parallel to each other, a front link member means connected to the front axle control bar, a rear connecting rod means connected to the controller means and the rear axle control bar, and a steering gear lever means connecting said front link member means and to said controller means for controlling the parallel movement and position of said front and rear axle unit means and the parallel position of the vehicle wheels.

2. In the apparatus of the class described adapted for controlling the position of the vehicle wheels and the wheel axles of the vehicle, comprising, a front and rear axle unit means each consisting of two pairs of axle frames laying in parallel to each other, two pairs of spring members connected at one end to each of said axle frames and the other ends extending outwardly and terminating with spring ends, a vehicle wheel drum plate member having one side provided with a plurality of shackle members for connecting said outwardly extending spring ends thereto and the other side thereof being connected to said vehicle wheel, an axle bar controlling member connected to each pair of said axle frames and a control rod member connected to said axle bar controlling member for controlling and regulating the parallel position of said front and rear axle frames and the vehicle wheels, substantially as described.

3. In the apparatus of the class described adapted to be used for controlling the axles and the wheels of the vehicle each of which is provided with a wheel driving axle, comprising a vehicle frame, a front and rear axle unit means connected to said frame which are transversely positioned and connected to each side of said frame constituting a central frame section, said axle unit means having a spring saddle member extending out of and positioned at each end thereof, a pair of spring upper plates hingedly connected to the ends of said central frame section and directly above the said saddle members which are extending outwardly therefrom and terminating with a top shackle member, a pair of spring supporting plates hingedly connected to the central frame section beneath said saddle members which are extending outwardly therefrom and terminating with a bottom shackle member, vehicle wheel plates each having a vehicle wheel attached thereto hingedly connecting said extended shackle members of said spring upper plates and said spring supporting plates for controlling the vertical position of said vehicle wheel plates, a plurality of spring members positioned between said spring saddle members, the spring upper plates and the spring supporting plates, a control link member connecting said front and rear axle unit means for controlling their relative and parallel position also the correlative positions of said wheels and for providing a space therebetween for the wheel driving axle to pass through, substantially as described.

ALOIS SKOK.